US006421132B1

(12) United States Patent
Brajovic (10) Patent No.: US 6,421,132 B1
(45) Date of Patent: Jul. 16, 2002

(54) METHOD AND APPARATUS FOR RAPID RANGE IMAGING

(76) Inventor: Vladimir M. Brajovic, 513 Harrogate Rd., Pittsburgh, PA (US) 15241

( * ) Notice: Subject to any disclaimer, the term of this patent is extended or adjusted under 35 U.S.C. 154(b) by 0 days.

(21) Appl. No.: 09/419,424

(22) Filed: Oct. 15, 1999

(51) Int. Cl.$^7$ .............................................. G01B 11/04
(52) U.S. Cl. ...................... 356/602; 356/607; 356/3.09
(58) Field of Search ................................ 356/607, 602, 356/606, 608, 3, 3.01, 3.09; 250/559.22, 559.23, 559.29, 559.31, 559.05; 348/138

(56) References Cited

U.S. PATENT DOCUMENTS

| | | | | |
|---|---|---|---|---|
| 4,325,640 A | * | 4/1982 | Dreyfus et al. | ............. 356/376 |
| 4,794,262 A | | 12/1988 | Sato et al. | |
| 5,059,814 A | | 10/1991 | Mead et al. | |
| 5,107,103 A | | 4/1992 | Gruss et al. | |
| 5,206,541 A | | 4/1993 | Boahen et al. | |
| 5,408,324 A | | 4/1995 | Sato et al. | |
| 5,436,727 A | | 7/1995 | Yokoyama et al. | |
| 5,847,833 A | | 12/1998 | Yokoyama et al. | |
| 6,166,810 A | * | 12/2000 | Nakayama et al. | ......... 356/376 |

OTHER PUBLICATIONS

"Range Imaging Sensors," by Paul J. Besl, Mar. 8, 1988, Research Publication GMR–6090, Computer Science Department, General Motors Research Laboratories, Warren, Michigan 48090–9055.

"A VLSI System for Light–Stripe Range Imaging," by Augustine Kuo, Dec. 8, 1992, Department of Electrical and Computer Engineering, Carnegie Mellon University, Pittsburgh, PA 15213.

"Computational Sensor For Visual Tracking With Attention," by Vladimir Brajovic, IEEE Journal of Solid–State circuits, vol. 33, No. 8, Aug., 1998.

\* cited by examiner

*Primary Examiner*—Hoa Q. Pham
(74) *Attorney, Agent, or Firm*—Arnold B. Silverman; William F. Lang, IV; Eckert Seamans Cherin & Mellott, LLC (57) ABSTRACT

A method of range imaging a scene includes directing a planar light beam onto a first portion of the scene, receiving a first reflected light stripe from that portion of the light beam on a row of sensors which emit responsive electrical signals. The first electrical signals are employed to create a salient feature containing saliency map with the salient feature being spatially related to the reflected light stripe. The light is subjected to sweeping to progressively create a plurality of light beams and reflected stripes leading to corresponding electrical output signals. This is repeated a plurality of times to establish the range image. In a preferred embodiment, a linear array of sensors has a winner-take-all circuit which selects a salient feature and employs that along with angle and time information to create an element of the image with repetition of the method generating the full range image. The light is preferably laser light and the sweeping action is preferably continuous through a plurality of cycles. Corresponding apparatus is provided.

45 Claims, 9 Drawing Sheets

METHOD AND APPARATUS FOR RAPID RANGE IMAGING

GOVERNMENT RIGHTS

The present invention was supported by the Office of Naval Research under the contract N0001495-1-0591. The United States Government has certain rights in this invention.

BACKGROUND OF THE INVENTION

1. Field of the Invention

The present invention relates to a method and apparatus for detecting range images indicative of the shape of objects in a visual scene. More specifically, the present invention is related to a combination of a triangulation-based image formation arrangement and electronic circuit which senses and process radiation received thereon, thereby enabling a rapid, accurate and high resolution collection of range data.

2. Description of the Prior Art

High-speed gathering of high-accuracy 3D information of visual scenes is important in many applications. As employed herein "visual scenes" or "scenes" means visible surfaces of objects in the environment falling within a range sensor's field of view. In computer-aided design (CAD) and computer graphics, for example, it is useful to digitize the 3D shape of these objects as a starting description of solid shapes as to ease and enable further manipulation and analysis of these shapes by the computer. Similarly, in industrial applications, such as object inspection, it is useful to acquire shape of industrial parts and analyze them by a computer. Since robots, as humans, can greatly benefit from the knowledge of 3D information about their environment, range images are extremely useful for robotics. Robotic applications benefiting from range images include automated assembly, obstacle detection, navigation and motion planing, among others.

The importance and usefulness of obtaining range images have been known by those skilled in the art. In a paper entitled, Range Imaging Sensors, published by General Motors Research Labs., Warren, Mich., Research Publication GMR-6090, March 1988, P. J. Besi describes various range imaging sensors. The paper concludes that triangulation-based light stripe methods are the most practical and quite robust in many applications.

As well known to many skilled in the art, a conventional triangulation range imaging method projects a slit ray of light onto a scene. A sensor array, usually a CCD camera, images the scene from an oblique angle. In such arrangement, the intersection of the surface of the object and the slit ray produces a contour in the image indicative of the local object shape. In order to ease the detection of the slit ray in the image, the illumination conditions are usually adjusted so that the projected slit ray generates a prominently bright features in the scene.

Conventional triangulation methods collect range maps one slice at a time. The slit ray illuminating a scene is fixed at a particular position. The scene is projected onto an image plane through a system of lenses. Ordinarily the scene is imaged with a one- or two-dimensional array of photodetectors, such as a CCD image sensor, whose row or rows are substantially perpendicular to the axis of rotation of the slit ray. The sensed image is collected and each row examined by a computer to find the location of the light ray projection in each row. Using this location and the geometric parameters of the triangulation imaging arrangement, the range or distance to the point on the object can be computed. By continuing this process for each row, one slice of range image is obtained. Then, the laser stripe is repositioned and another slice of the range image is collected. One problem with this known process is that it is too slow as each slice requires at least one camera frame time.

High-speed triangulation approaches have been proposed in prior art in which the slit ray continuously sweeps across the scene. This approach is sometimes called "dynamic triangulation".

U.S. Pat. No. 4,794,262 to Y. Sato et al. discloses a triangulation setup with a continuously sweeping slit ray across the scene. The scene is viewed with the array of mutually independent photosensors. Each photosensor in the array has its own line of sight and "sees" the slit ray only once as it sweeps by, assuming there are no interreflections among surfaces in the scene. The time t when a particular detector at a particular location sees the laser is recorded. Then using a computer, the position that the slit ray assumed at the instant t is determined. Again, using the location of the particular detector together with the geometric parameters of the slit ray and the triangulation setup, the range along the line of site for the particular detector is computed. In this disclosure, the time is recorded in a memory array whose cells have one-to-one correspondence to the detector array cells.

U.S. Pat. No. 5,107,103 to Gruss et al. discloses a very-large-scale-integration (VLSI) chip method. Each cell in the sensor array has a photodiode, a comparator for thresholding the sensory signal to detect when the slit ray shines across the photosensor and an analog memory for storing the timestamp in each cell. By hard-wiring a memory cell in each cell this method also records time in a memory array whose tells have one-to-one correspondence to the detector array cells. One deficiency of this method is the fact that the thresholding is not a reliable method for detecting the passage of the slit ray. The sensory signal may be unable to reach the preset threshold due to varying reflectivity of the object and circuitry temperature drifts. Therefore, the passage of the projection of the slit ray across a cell may remain undetected.

U.S. Pat. No. 5,408,324 to K. Sato et al. shows another VLSI implementation is of the same method whereas each cell in the sensor array includes two photosensors disposed side by side in the direction of the slit ray sweep. By comparing the photocurrents, the passage of the image of the slit ray is detected when the appreciable difference between the photocurrents is observed. Yokoyama et al. U.S. Pat. No. 5,436,727 discloses that such a detection of the slit ray passage is more robust to varying object reflectance and temperature variations, and remedies one deficiency of the implementation by Gruss et al. This approach can produce a new problem. While the pair of photosensors is waiting to "see" the image of the slit ray, their sensory signals are of similar intensities, thus making it difficult for the comparator in each cell to determine which signal is greater. In fact, due to the noise and the limited resolution of the comparator, the comparator's output is very likely to transition erratically before the image of the slit ray actually passes cross the photosensors. A more recent patent by the same group of inventors, U.S. Pat. No. 5,847,833 to Yokoyama et al., introduces a hysteresis to the comparison process. The area of one of the two photosensors is sized a few percent larger than the area of the other. The smaller photosensor is the one that is to receive the image of the slit ray first, while the larger photosensor receives it second. The object is to prevent faulty and premature transitions of the comparator's output. Due to the ambient illumination and the reflectivity patterns of the scene, however, one might have such a light distribution over the two photosensors that could nullify the hysteresis produced by different area size, thus still causing unreliable performance. This disclosure also records time in a memory array whose cells have one-to-one correspondence to the detector array cells.

Several deficiencies of the above-described prior art have already been mentioned. The main deficiency of these three methods stems from the fact that they are cell-parallel. That is, the range sensor is an array of mutually independent cells that are able to detect the slit ray as it sweeps across the scene and record the time when it is detected. These approaches, therefore, require one-to-one correspondence between the memory array cells and the detector array cells. This deficiency of these methods is manifested in at least two ways. Large cell size is required if the memory is located in the cell together with the slit ray detector (see U.S. Pat. No. 5,107,103 to Gruss et al.). The large cell size limits the spatial resolution of the range sensor. If the memory cell is not located in the close electrical proximity to the detector, a cumbersome readout and communication implementation is required to associate the detector array with the memory array SO as to ensure recording of the timestamp in a timely and accurate manner. See U.S. Pat. No. 4,794,262 to Y. Sato, U.S. Pat. No. 5,408,324 to K. Sato et al. U.S. Pat. No. 5,436,727 to Yokoyama and U.S. Pat. No. 5,847,833 to Yokoyama. Such cumbersome readout introduces latency that degrades accuracy of stored timing information, and consequently degrades the accuracy of the range measurement.

The main deficiency of these cell-parallel techniques can be avoided by noting that the triangulation ranging technique is inherently row-parallel. Assuming there are no significant multiple reflections among surfaces in the scene, there is only one location in each row that "sees" the image of the slit ray at any given time. As a result, the detection of the image of the slit ray is a global operation over plurality of photosensors in each row. In the row-parallel approach, the task is to detect repeatedly locations of the slit ray image as it sweeps across the row and associate those locations with times when the detection occurred. If memory is needed, the row-parallel approach requires only one memory per row for storing timestamps, thus enabling smaller cells and higher spatial resolution.

A Master Thesis by Kuo entitled, "A VLSI System for Light-Stripe Range Imaging", submitted to the Department of Electrical and Computer Engineering, Carnegie Mellon University, Pittsburgh, Pa. (1992) shows a row-parallel sensor with the dynamically swept slit ray. Kuo shows a single one-dimensional (1D) array of photosensors and a distributed analog winner-take-all (WTA) circuit. As known to those skilled in the art, a WTA is a global processor that takes a plurality of inputs and identifies one input that has the largest magnitude. In addition, the WTA used by Kuo continuously reports the intensity of the winning input.

The underlying assumption in Kuo's work is that under favorable imaging conditions the slit ray image is the strongest optical feature in the row causing the WTA to identify the location of that feature. Furthermore, as the projection of the slit ray passes across the winning photosensor, the magnitude of the winning input continuously reported by the WTA will first rise, then peak and finally decay. The peak is observed when the image of the slit ray is substantially centered on the photosensor. Therefore, by detecting a timing of this peak, Kuo is able to determine timing when the sweeping image of the slit ray is substantially centered on the photodetector of the cell identified by the WTA as the winner. To locate the winning cell, Kuo rapidly scans and polls each cell of the WTA to determine which one is winning. Only one peak detector and one memory cell for storing timestamps is required per row, provided that the memory is read out before it is needed for the next timestamp storage.

Kuo's thesis partially remedies the problem of large cell size of the prior art such as Gruss et al. U.S. Pat. No. 5,107,103 and remedies the problem of cumbersome readout apparent in the other two prior art embodiments described earlier. However, several deficiencies remain. One deficiency is that to obtain a well-pronounced temporal peak the photosensor needs to be large enough to collect enough photons as the slit ray image passes over it. As a result, the detector size still limits the spatial resolution of the sensor. While in many industrial applications the image formation arrangement can be controlled so that the slit ray produce the brightest features in the scene, other important applications remain in which it cannot be done. Therefore, the main deficiency of Kuo's range finder is the requirement that the slit ray produces the brightest feature in the scene. Another deficiency of Kuo's device is the electronic scanning of the WTA for determining which input is winning. Such scanning does not extend well into two-dimensional sensors.

Despite these prior art systems, there remains a very real and substantial need for a method and apparatus for rapid, accurate and high resolution range imaging by overcoming disadvantages and limitations of the prior art.

SUMMARY OF THE INVENTION

The above-described need has been met by the present invention.

The method of the present invention provides for range imaging of a scene by directing a planar light beam onto a first portion of the scene and delivering a reflected light stripe from the first portion to a row of sensors. The sensors emit responsive electrical signals which are processed by creation of a salient feature containing saliency map with the salient feature being spatially related to the reflected light stripe and not being based on the instantaneous light impinging on a single sensor. Continued sweeping of the light progressively establishes salient feature information for a plurality of scene portions which information by means of an appropriate processor, such as a computer, is converted into the range image. The information obtained from the sensor output may be processed by a preprocessor array to convert it into a saliency map after which, in a preferred embodiment, a winner-take-all processor selects the salient feature which may, for example, be a peak or valley from a particular stripe as determined by a linear sensor array.

The information regarding position may be combined with time or angle information to establish a segment of the scene image with repetition of the process creating the entire image.

The apparatus of the present invention contemplates a triangulation arrangement wherein a light source provides a planar light beam which impinges upon a portion of the scene which may be a three-dimensional physical object and has a reflected light stripe directed toward a linear sensor array or two parallel sensor arrays with a salient feature of the light impinging on the sensor array being determined as by a winner-take-all circuit. This information is delivered to a processor along with information with respect to time and angle and an image unit is generated. Repeating this cycle through sweeping of the light beam to different portions of the scene or object sequentially produces the scene image.

It is an object of the present invention to provide a method and apparatus for rapid range imaging which enables high spatial resolution sensing.

It is a further object of the present invention to provide such a system which provides rapid high resolution range images of scenes.

It is a further object of the present invention to provide such a system wherein the amount of circuitry in each cell is reduced.

It is yet another object of the present invention to provide such a system which provides for efficient on-chip processing through the use of winner-take-all circuitry on the chip.

These and other objects of the invention will be more fully understood from the following description of the invention on reference to the illustrations appended hereto.

DESCRIPTION OF THE PREFERRED EMBODIMENTS

Referring to the drawings in greater detail wherein like reference numerals refer to similar or identical parts throughout various views, several preferred embodiments of the present invention and methods of practicing the present invention will be considered.

Figure 1:
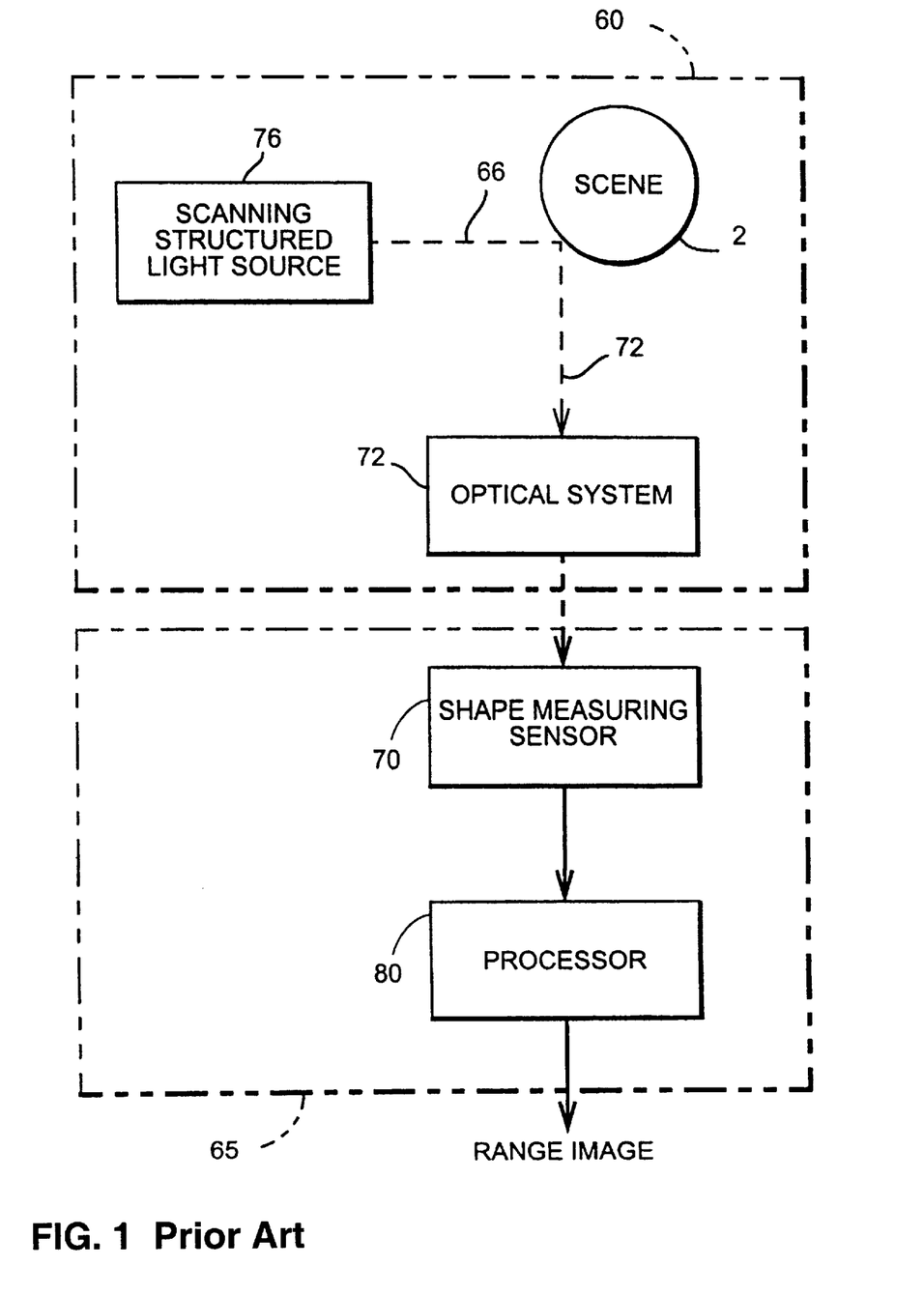
FIG. 1 is a schematic illustration of a prior art optical image formation unit and cooperating sensor which is usable in the present invention.

As shown in FIG. 1, the present invention employs an optical image formation arrangement 60 and an electronic sensor 65 that detects and process optical image impinging on its sensitive surface according to the present invention.

In the optical image formation subsystem 60, a scanning structured light source 76, which is preferably a laser, causes a light beam 66 to impinge on a scene 2 with the reflected light beam 72 being received by the optical system 74 which emits a corresponding optical signal to the electronic sensor 65. Sheet measuring sensor 70 receives the output from optical system 74 and delivers an electrical signal corresponding to the light which the scene 2 has reflected to processor 80 which may be any sort of suitable microprocessor, look-up table or other data processing means which, in turn, emits an output of the range image.

Figure 2:
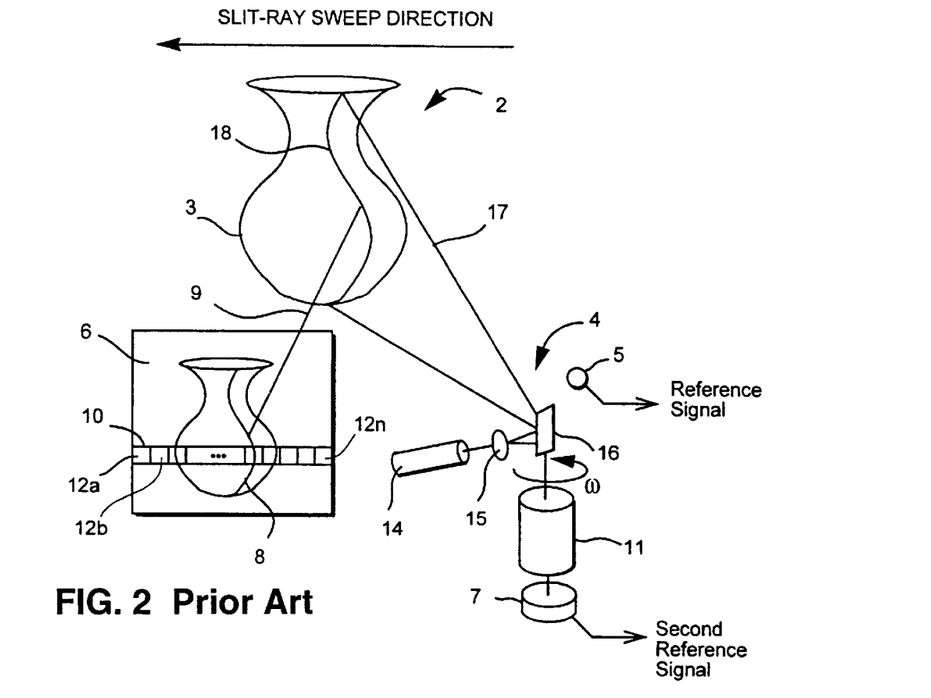
FIG. 2 is a partially schematic illustration of a prior art imaging sys usable in the present invention.

FIG. 2 shows a global view of the image formation arrangement 60 of the present invention. A slit ray scanner 4 sweeps a scanning slit ray of light 17 across surfaces of object 3 in the scene 2. At the intersection of the slit ray 17 with surfaces of the objects that are at least in part diffusively reflective an illuminated contour 18 is formed. The scene 2, together with the illuminated contour 18 therein, is optically projected onto an image plane 6 by an optical projection system 9. The illuminated contour 18 projects into a light stripe 8 in the image plane 6.

A plurality of photodetectors $12a$, $12b$, ... $12n$, such as photodiodes or phototransistors, for example, is disposed side by side in a one-dimensional (1D) photodetector array 10. At least one such 1D photodetector array 10 is placed in the imaging plane 6. The photodetectors $12a$, $12b$, ... $12n$ convert the light energy gathered at the image plane 6 including the energy of the light stripe 8 and produce a plurality of electronic sensory signals forming an electronic image. As the slit ray 17 sweeps across the scene 2 so does the illuminated contour 18 on the scene 2, and its optical image 8 in the image plane 6. It is preferred that the slit ray 17 sweep continuously over a plurality of positions sequentially in range imaging the scene.

Figure 3:
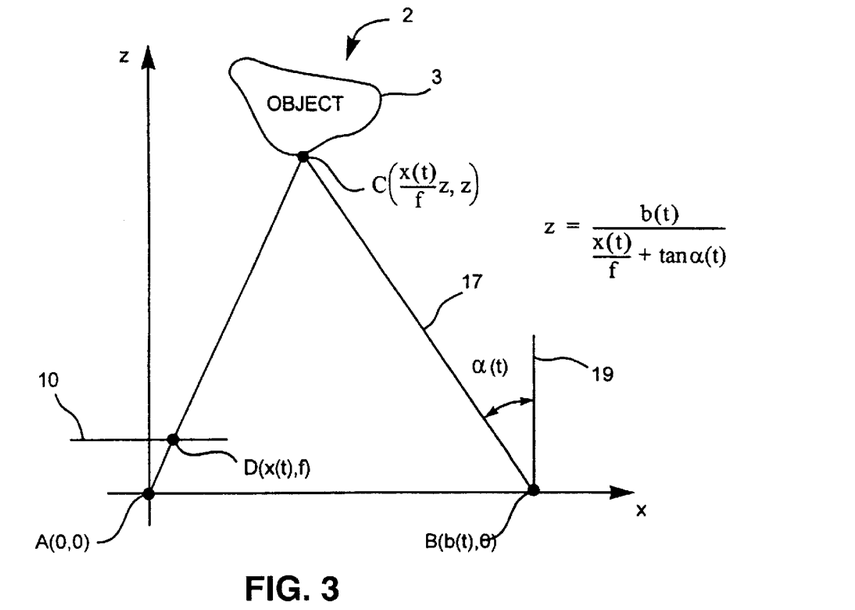
FIG. 3 is a schematic illustration showing geometry of an image formation arrangement of the present invention.

FIG. 3 shows a simplified geometry of the image formation arrangement of the present invention. Four key geometric points are shown together with their (x,z) coordinates in reference to x-z Cartesian coordinate system. Point A(0,0) is the optical center of the pinhole projection system or perspective lens projection system. In the physical image formation system, at least one row of sensors, such as the 1D photodetector array 10, is perpendicularly centered at the z-axis, at the distance f along the z-axis behind the optical center. The scene 2 being in front of the optical center along z-axis is therefore projected onto the sensor array. As those skilled in art will recognize, the 1D photodetector array 10 in FIG. 3 is shown in front of the optical center A(0,0) to simplify the geometric consideration by avoiding the inversion of the optical image through the pinhole or the lens while preserving the geometric relationship in the image formation system. The optical center A(0,0) and the line of the 1D photodetector array 10 determines the plane-of-sight for the sensor (the plane-of-sight not shown in FIG. 3). The points from the scene 2 laying in the plane-of-sight of the sensor comprise the sensor's field-of-view.

A reference plane 19 is taken normal to x-axis in the example shown in FIG. 3. The plane of the scanning slit ray 17 is normal to x-z plane. In FIG. 3, the scanning slit ray 17 is frozen at time t at an angle a(t) in reference to the reference plane 19. At the instant t the scanning slit ray 17 intersects the x-axis at the point B(b(t),0). The scanning slit ray 17, the surface of objects in the scene 2 and the sensor's plane-of-sight all intersect in a point C(x(t)*z/f, z) which lies on the illuminated contour 18 of FIG. 2. The optical image of the point C(x(t)*z/f, z) lies at the point D(x(t),f) on the 1D photodetector array 10, the point D(x(t),f) simultaneously being a point on the light stripe 8 of FIG. 2. The range or distance z from the x-axis to the objects' surfaces in the scene 2 is found as:

$$z = \frac{b(t)}{\frac{x(t)}{f} + \tan(\alpha(t))} \quad (1)$$

By determining the location x(t) of the light stripe 8 along the 1D photodetector array 10, together with measuring the position of the scanning slit ray 17 as determined by b(t) and a(t), one point of range image can be computed. As the slit ray scanner 4 sweeps the scanning slit ray 17 across the scene 2 by changing either α(t) or b(t) or both, additional points of range in the field of view of the one-dimensional photodetector array 10 can be collected. Those skilled in art can readily adjust the geometric consideration and the formula (1) derived above, by selecting different reference coordinate system, different reference plane 19 or even use non-perspective projection geometry, for example, and still fall within the scope of the present invention.

Those skilled in the art know numerous ways of devising the scanner 4 to enable precise temporal determination of b(t) and α(t) as the scanning slit ray 17 sweeps across the scene. One example shown in FIG. 2 shows a scanner 4 for generating the scanning slit ray 17, by first generating a laser beam with a laser source 14, then diverging a laser beam through a cylindrical lens 15 into a planar beam, and finally reflecting the planar beam from a scanning mirror 16 driven by the scanning mirror drive 11. (A more traditional way of generating a planar beam, is by obstructing with a slit aperture an extended light source, such as an incandescent lamp lit behind a frosted glass.) The scanning mirror 16 could be rotating polygonal mirror with predetermined number of facets. The deflection angle α(t) of the slit ray 17 is determined by the rotational angle of the polygonal mirror. Therefore, the deflection angle α(t) of the slit ray 17 may be identified by directly measuring the rotational angle of the polygonal mirror with a rotational encoder 7 mount on the shaft of the scanning mirror drive 11. In addition, those skilled in art will recognize that in the above-described rotating polygonal mirror arrangement, b(t) is uniquely determined by α(t) once the geometric relationship of the slit-ray scanner 4 in respect to the reference z-x coordinate system is selected. The rotational angle of the polygonal mirror can be measured with a digital counter which is incrementally advanced with a recurring digital pulses from the incremental shaft encoder 7. Alternatively, an absolute shaft encoder can provide the absolute digital code indicative of the rotational polygonal mirror angle.

As the polygonal mirror 16 is ordinarily controlled to have rotational movement at a known (constant or non-constant) angular velocity ω it is possible to determine the deflection angle of the slit ray 17 by measuring elapsed time t the scanning slit ray 17 takes to travel from the reference plane 19 to a position indicated by α(t) and b(t). The instant of passage of the scanning slit-ray 17 through the reference plane 19 can be indicated by a reference signal. The reference signal could be generated with a rotational shaft encoder 7 when the rotational mirror 16 passes at least one predetermined reference point in each revolution. Alternatively, the reference signal can be generated preferably once per each sweep of the scanning slit ray 17, by making a use of a reference photodetector 5, such as a photodiode or phototransistor, for example, placed in the vicinity of the scanning mirror 6 and substantially in the predetermined reference plane 19. The reference signal is then generated when the reference photodetector 5 is illuminated with the scanning slit ray 17. The elapsed time t can be measured with a digital counter that is incrementally advanced with periodically repeating pulses in a free-running digital clock. The reference signal may reset this counter in order to mark the beginning of measuring the time interval.

EXAMPLE

The magnitude and scale of geometric quantities involved in the above-described optical image formation arrangement will depend on the requirements of a particular application, the power of the slit ray source, the reflectivity of the scene surfaces, and other variables. For illustration purposes, one practical realization may have the following specifications: 5 mW, 670 nm laser beam of 2 mm diameter is fanned to a 40° slit ray which is in turn repeatedly swept through 40° sweeps at the rate of 30 times per second, illuminating a scene whose surfaces are substantially within 70 cm to 100 cm range, with the separation of the sensor and the scanner (quantity b) substantially within 10 cm to 15 cm range. Fanned laser sources, also known as line projectors, can be purchased commercially (see www.lasiris.com). The rotating mirror scanners with the scanning mirror drives can be also purchased commercially (see www.LincolnLaser.com).

A shape-measuring sensor 70 (FIG. 1) senses the optical image 6 and is responsible for determining the location x(t) of the light strip 8 along at least one 1D photodetector array 10.

Figure 4:
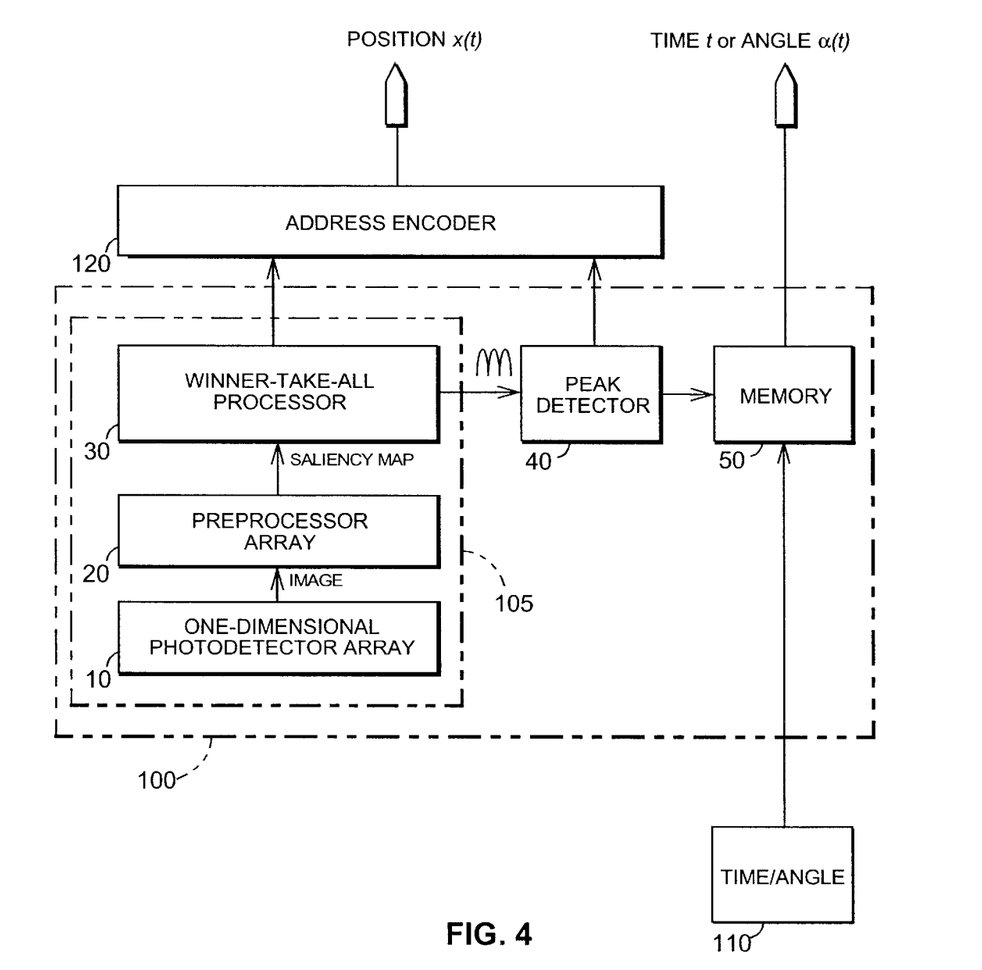
FIG. 4 is a block diagram of a one-dimensional (1D) embodiment of the present invention.

Referring now to FIG. 4, one 1D embodiment of the shape-measuring sensor 70 will be described. The shape-measuring sensor 70 has an optical winner-take-all 105 for receiving, sensing and processing optical images. The optical winner-take-all 105 is connected to an address encoder 120. The optical winner-take-all 105 is also connected to a peak detector 40. The peak detector 40 supplies a latching signal to a memory 50. The peak detector 40 may supply its latching signal directly to the processor 80. The peak detector 40 may also supply a signal to the address encoder 120. The memory 50 has a receiving port for receiving time or angular information as supplied by a means for measuring time or angle 110. (The above-presented description of the slit ray scanning system 4 also discusses several possible embodiments of the means for measuring time or angle 110.) The memory 50 also has an output port for sending its content to the processor 80 for delivering position and time information thereto. The address encoder 120 is also connected to the processor 80.

The optical winner-take-all 105 includes the 1D photodetector array 10 connected to a preprocessor array 20 which in turn connects to an electronic winner-take-all processor 30. A plurality of photodetectors 12a, 12b, . . . , 12n disposed side by side and organized into a line comprise the 1D photodetector array 10. Each photodetector 12a, 12b, . . . , 12n produces an electronic sensory signal related the magnitude of the radiation received thereon. The collection of all such sensory signals constitute an electronic image sensed by the 1D photodetector array 10. The electronic image from the 1D photodetector array 10 is supplied to the preprocessor array 20 which serves to create a saliency map.

Figure 5:
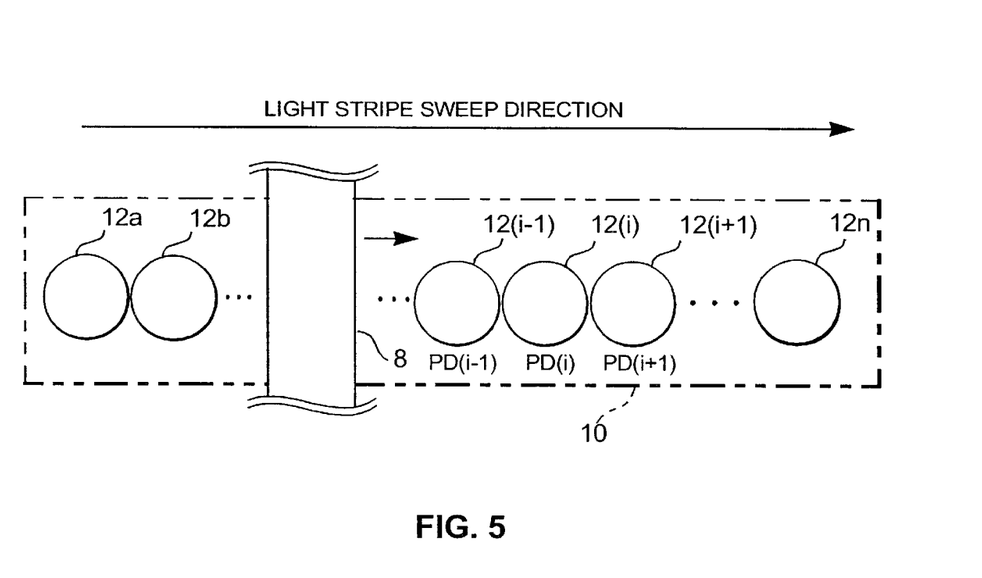
FIG. 5 is a schematic illustration showing a light stripe sweeping across a 1D photodetector array.
Figure 6:
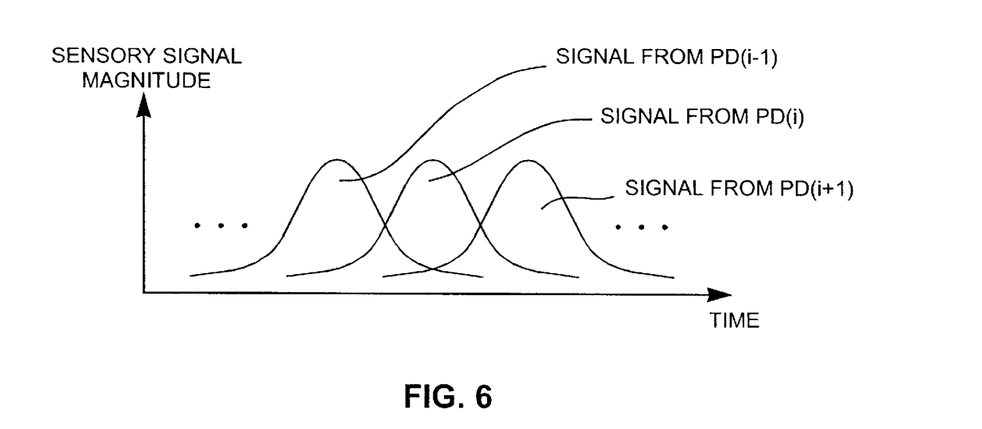
FIG. 6 is a plot of time versus sensory signal magnitude as related to the detector arrangement of FIG. 5.

The image formation arrangement 60 (FIG. 1) produces and focuses the optical image 6 of a scene 2 onto the 1D photodetector array 10. The optical image 6 contains the light stripe 8 that is substantially perpendicular to the array of photodetectors 10. FIG. 5 shows how the light stripe 8 sweeps across the array of photodetectors 10 by entering at one side of one photodetector 12a, 12b, . . . , 12n and leaving it at the opposite side of one photodetector 12a, 12b, . . . , 12n. FIG. 6 shows the magnitude of the sensory signal plotted against time for three consecutive photodetectors 12a, 12b, . . . , 12n. In the absence of the light stripe 8, each photodetector 12a, 12b, . . . , 12n reports the magnitude of the ambient radiation received thereon. As the light stripe 8 gradually enters one photodetector 12a, 12b, . . . , 12n, the radiation impinging on its sensitive surface increases, thus causing the one photodetector 12a, 12b, . . . , 12n to report the increasing electronic sensory signal. When the light stripe 8 is substantially centered on the one photodetector 12a, 12b, ..., 12n, the radiation impinging on the photodetector's sensitive surface attains maximum, causing the corresponding sensory signal to peak. As the light stripe 8 leaves the one photodetector 12a, 12b, ..., 12n, the corresponding sensory signal diminishes and returns to its original ambient level. A saliency map is created and contains the salient feature which is spatially related to the reflected light stripe and in some embodiments not based solely on the instantaneous light impinging on a single sensor.

As the light stripe 8 passes across, the sensory signals from three adjacent photodetectors 12a, 12b, ..., 12n shown in FIG. 5 exhibit the waveform shown in FIG. 6. The underlying assumption is that all three adjacent surface patches in the scene that are viewed by each of the three photodetectors 12a, 12b, ..., 12n shown in FIG. 5 are at substantially equal distance and have substantially similar reflectances and ambient illumination. The sensory signals similar to these are fed to the preprocessor array 20 for further processing.

The preprocessor array 20 computes a saliency map. The saliency map has one-to-one spatial correspondence to the image received from the 1D photodetector a array 10. The saliency map encodes a salient feature when it is present in the image from the 1D photodetector array 10. The saliency map preferably produces strong signals substantially at the location of the salient feature in the sensory signals. In the context of the present invention, the salient feature in the sensory signals is the light stripe 8, while preferably excluding electrical signals due to ambient light. The role of the preprocessor array 20 is to produce the strongest signal in the saliency map at the location indicative of the location of the light stripe 8 in the 1D photodetector array 10. The salient feature may, for example, be determined from the saliency map when the reflected light stripe (a) is transitioning from one sensor to another or (b) when it is substantially centered over a sensor.

Figure 7:
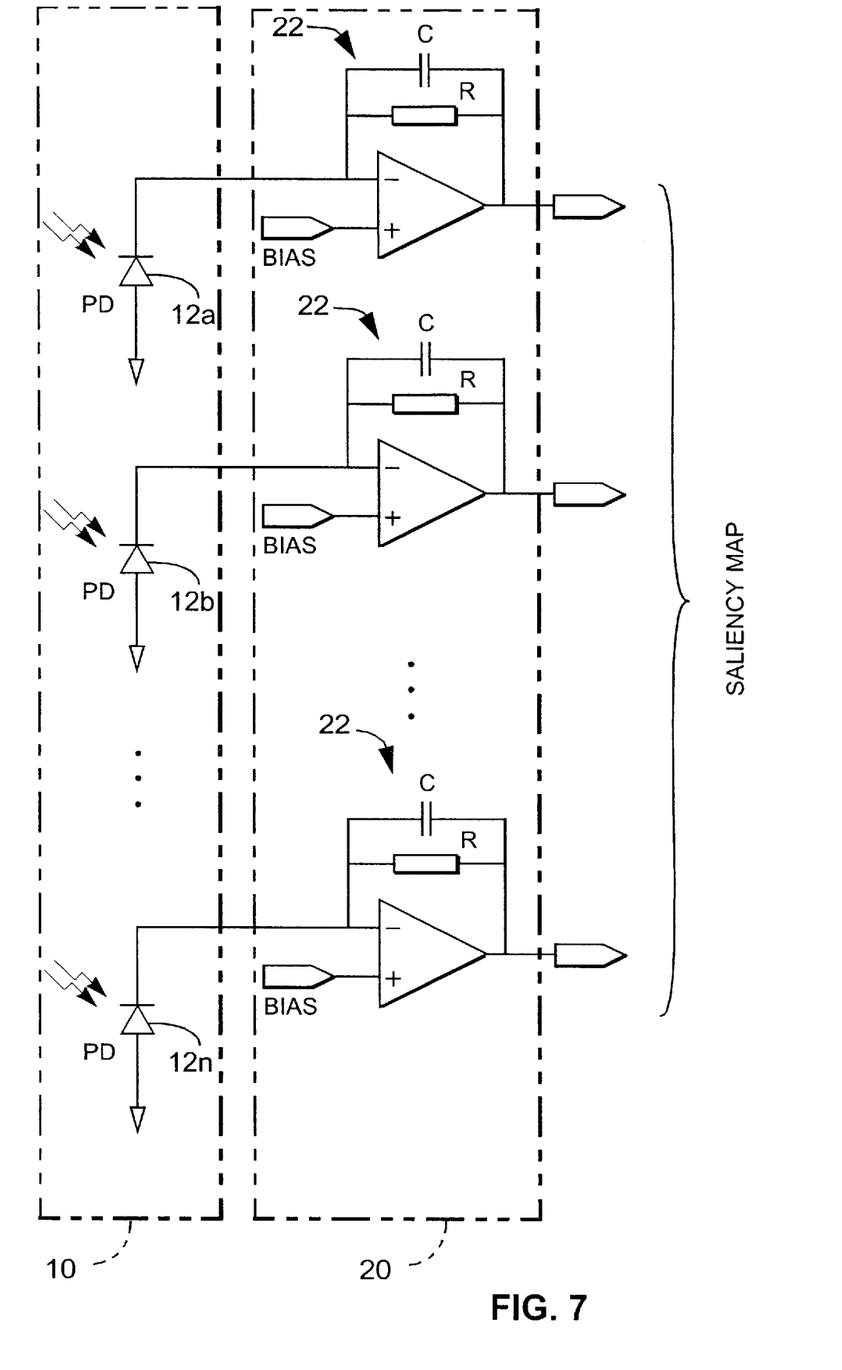
FIG. 7 illustrates an example of a processor generating saliency map.

Amplifying the sensory signals produces a simplified example of the saliency map. In one embodiment shown in FIG. 7, the photodetectors 12a, 12b, ..., 12n which may be photodiodes and the preprocessor array 20 may be an array of mutually independent current-to-voltage amplifier 22. The sensory signal from photodiodes is the photocurrent that is converted and amplified to voltage by the current-to-voltage amplifier 22. The saliency map produced in this way will indicate the location of the light stripe 8 as long as the illuminated contour 18 is the brightest feature in the filed of view of the 1D photodetector array 10 most of the time. This condition can be satisfied in majority of industrial applications, by either providing sufficiently powerful slit ray, or by controlling and optically filtering out the ambient illumination, or by both. In the case of this simple example of saliency map, the saliency map is the amplified version of the sensory signals partially illustrated in FIG. 6.

Saliency may be encoded as the magnitude of the value contained within the saliency map with the salient feature having the largest magnitude. The winner-take-all circuit may be employed to determine the largest magnitude location. The method may also be employed to determine the magnitude of the selected salient feature.

Figure 8:
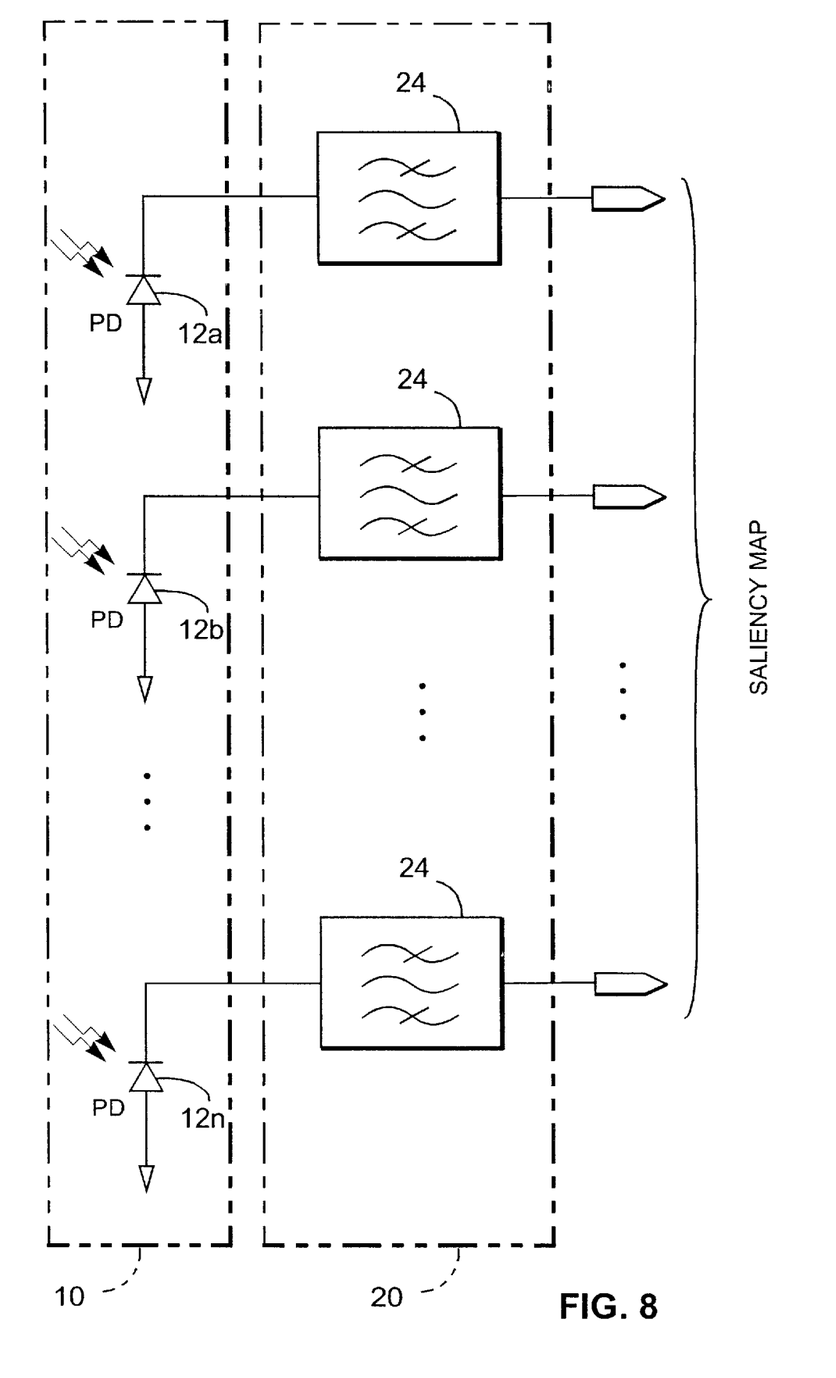
FIG. 8 illustrates a modified form of processor for generating a saliency map which employs temporal filters.

When the requirement of an application cannot guarantee that the illuminated contour 18 is not the brightest feature in the sensor's field of view because other points in the scene are brighter due to the scene reflectances and ambient illumination, then another saliency map is preferably employed. According to the present invention, the preprocessor array 20 may include a temporal filter 24 shown in FIG. 8. The filter 24 is preferably a band-pass filter. Further, the filter 24 is preferably tuned to substantially pass frequencies that substantially describe the pealing bell-shaped pulses of FIG. 6. In this way, the preprocessor array 20 eliminates the low frequency portion of the sensory signals that is due to ambient illumination while leaving the portion that is due to the light stripe 8. Those skilled in the art can design other temporal filters for favorably exploiting temporal features created in the electronic image by the light stripe 8, and still remain within the scope of the present invention. The saliency map produced by this embodiment of the preprocessor array 20, shown in FIG. 8, is similar to the waveforms illustrated in FIG. 6, except that perhaps the tails of the bell-shaped waveforms are favorably diminished leaving more prominent peaks indicating the location of the light stripe 8.

Figure 9:
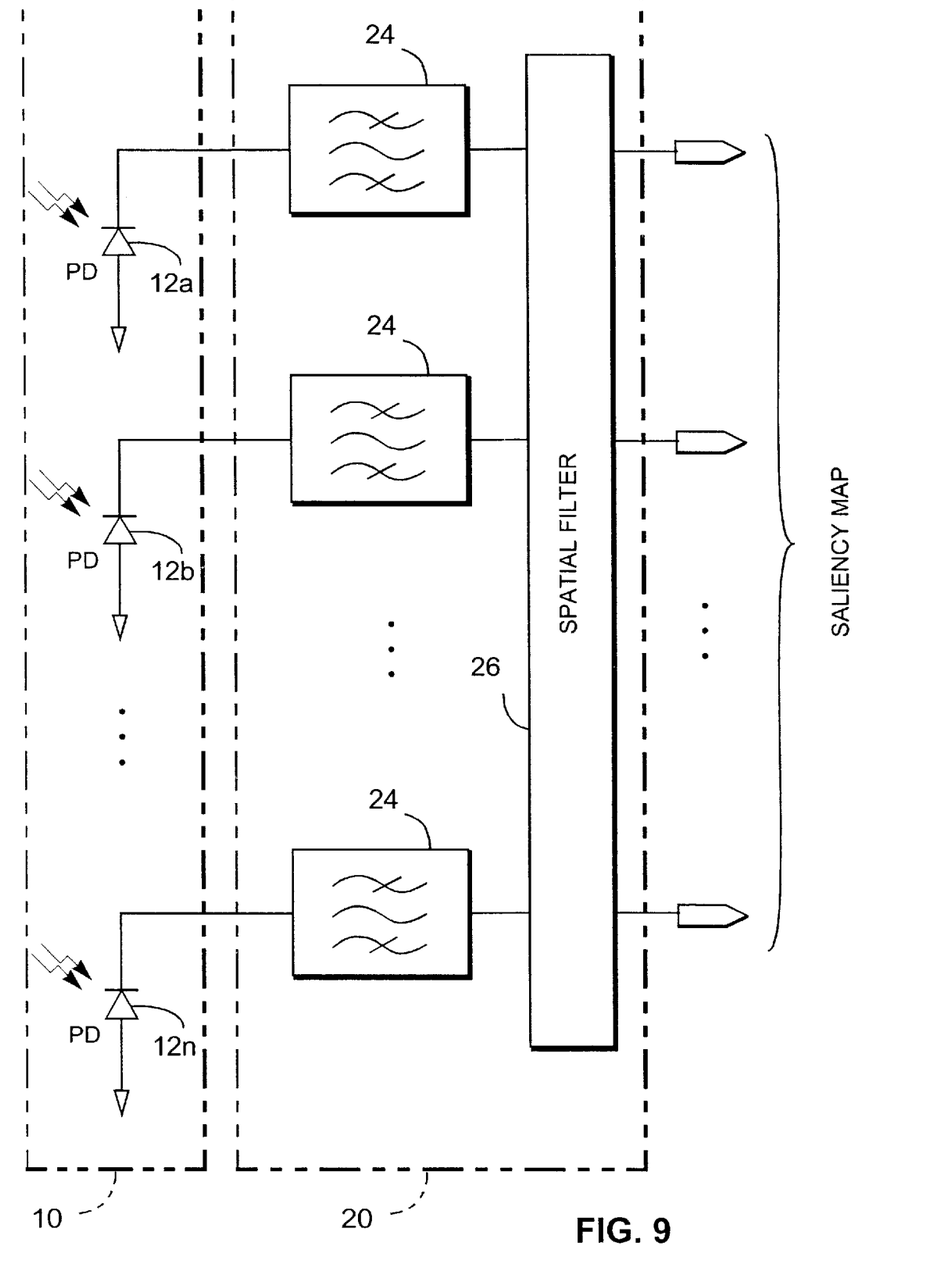
FIG. 9 shows a processor for producing a saliency map having a spatial filter.

Additional improvements for producing a more robust saliency map in the preprocessor array 20 may be employed. For example, one improvement is to introduce spatial filtering in addition to temporal filtering (see FIG. 9). The salient feature, that is, the light stripe 8, produces temporal bell-shaped waveform in each photodetector 12a, 12b, ..., 12n, as illustrated in FIG. 6. Nevertheless, it simultaneously produces a bell-shaped spatial feature across several adjacent photodetectors. Those skilled in image processing can easily design spatial filters matched to the spatial profile characteristic of the salient feature in the electronic image. A finite impulse response (FIR) spatial filter known as Laplacian filter having a 3-pixel support and coefficients of [−0.5, 1, −0.5] is one example of the spatial filtering that filters out low spatial frequencies of the image while enhancing a bell-shaped spatial pattern potentially produced by the light stripe 8. Those skilled in art can design other spatial filters more appropriate for a particular spatial features of the light stripe 8 and still fall within the scope of this invention. The saliency map produced by this improvement to the preprocessor array 20 is similar to the waveforms illustrated in FIG. 6 except that the tails of the bell-shaped waveforms are further diminished.

Figure 10:
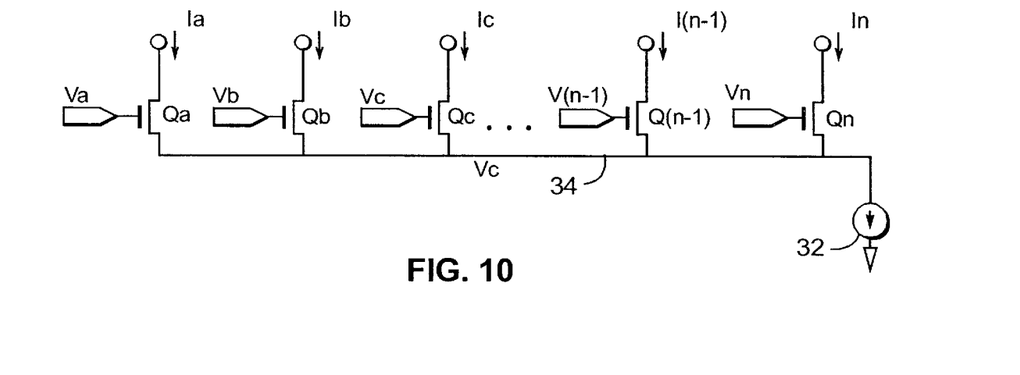
FIG. 10 shows schematically a form of winner-take-all circuit employable in the present invention.

The saliency map from the preprocessor array 20 is fed to the winner-take-all processor 30. The principal function of the winner-take-all processor 30 (FIG. 4) in the present invention is to determine spatial location of the light stripe 8 along the 1D photodetector array by examining the saliency map. The winner-take-all processor 30 employed in one embodiment of the present invention performs two functions. First, it uniquely identifies the strongest input in the saliency map. Second, it continuously reports the magnitude of the identified strongest input of the saliency map. One form of the winner-take-all processor 30 is shown in FIG. 10. In this example, a plurality of metal-oxide-semiconductor (MOS) transistors $Q_1 \ldots Q_N$ are source-coupled by a common wire 34 which is supplied with a tail current from a current source 32. The voltage on the gates of the transistors $Q_1 \ldots Q_N$ are the inputs for this realization of the winner-take-all processor. A transistor whose gate voltage is sufficiently higher than the voltage on the gates of others, will win substantially all of the tail current. Therefore, the strongest input is identified by a substantially non-zero current in the drain of the transistor receiving the strongest input. This is essentially, current-mode 1-of-N binary encoding of the winner's identity. This 1-of-N code is sent to the address encoder 120 (FIG. 4) where it can be easily converted to any other binary code, for example, a natural binary code.

The magnitude of the winning input voltage is reported on the common wire 34 as a voltage Vc. As the winning transistor essentially takes all of the tail current, other transistors are turned off. Mentally, we can remove the turned-off transistors from FIG. 10 for a moment. What remains is the source follower that drives the voltage Vc to follow the input of the winning transistor. Therefore, this form meets both functions of the winner-take-all processor 30 for one embodiment of the present invention.

There are other winner-take-all circuit realizations that could be used. U.S. Pat. No. 5,059,814 to Mead et al. shows a winner-take-all circuit with current-mode inputs and voltage-mode outputs. U.S. Pat. No. 5,206,541 to Boahen et al. in FIG. 9 shows a similar winner-take-all circuit with current-mode input and current-mode output. Finally, more details on how to use these winner-take-all circuits can be found in the paper by Brajovic et al., "Computational Sensor for Visual tracking with Attention", published in IEEE Journal of Solid-State Circuits, Vol. 33, No. 8, August 1998.

Figure 11:
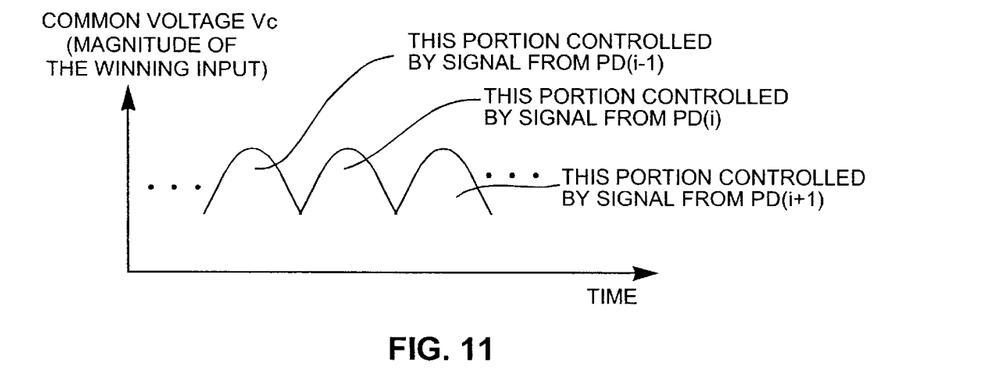
FIG. 11 shows a winner-take-all intensity waveform.

FIG. 11 partially shows the waveform of the voltage Vc on the common wire 34, when the saliency map composed of waveforms partially shown in FIG. 6 are fed to the winner-take-all processor 30. The voltage Vc waveform, referred to as a winner's intensity waveform, has two kinds of peaks, positive peaks and negative peaks. The positive peaks occur when the image of the light stripe 8 crosses the center of the photodetector. The negative peaks, or valleys, occur when the light stripe 8 transitions from one detector to another. This waveform is fed to the peak detector 40 shown in FIG. 4.

The peak detector 40 detects both positive and negative peaks in the winner's intensity waveform. Upon detecting either peak, the peak detector 40 latches into the memory 50 or the processor 80 the time and/or angular data as supplied by the means for measuring time or angle 110. The peak detector 40 also knows what kind of peak has been detected. This information is supplied to the address encoder 120 which enables it to effectively double the spatial resolution with which the shape measuring sensor 70 detects the location x(t) of the light stripe 8 along the 1D photodetector array 10. For example, if there are N photodetectors 12a, 12b, 12c, ... 12n in the 1D photodetector array 10, then there are N+(N-1) possible peak locations; N possible locations are centers of the N detectors, and (N-1) possible locations are the interfaces between adjacent detectors. Not necessarily, all of these locations will be visited by the light stripe 8. That is because a particular spatio-temporal pattern of the light stripe 8 sweep across the 1D array of photodetectors 10 depends on the shape of the scene 2 being detected. Nonetheless, by doubling the spatial resolution of the range image to almost twice the number of photodetectors, the present invention enables a use of twice as large photodetectors than any other approach in the prior art, while maintaining the size of range image. This enables higher sensitivity which in turn yields to faster and more reliable performance of the range sensor.

The processor 80 receives spatial information from the address encoder 120 and angular/temporal information from the memory 50. The function of the processor 80 computes range points and forms the entire range image. First x(t) is found as:

$$x(t) = (2X(t) - P(t) - N + 1)\frac{d}{2} \quad (2)$$

where N is the number of photodetectors, d is the width of each photodetector in the direction of the 1D photodetector array 10, X(t) is a positive integer from 0 to N−1 specifying the address of the photodetector that is being identified as the winner at time t. P(t) is 1 if the most recent peak detected was due to the light stripe 8 being at the center of a photodetector (e.g., a positive peak in this embodiment), and 0 if the peak detected was due to the light stripe 8 transitioning from one photodetector to another (e.g., a negative peak in this embodiment). The factor N appears in the formula because according to FIG. 3, 4t) is measured in reference to the middle of the 1D photodetector array 10. The derivation of x(t) presented here is an illustration. Those skilled in art will be able to modify the above formula (2) to include a particular geometry and the reference coordinate system of interest and to account for peculiar transitions of the light stripe 8 due to the range discontinuities or object occlusions. Such modifications fall within the scope of the present invention.

The range is finally computed by plugging in x(t) and α(t), and potentially b(t)=function(α(t)) into the above-presented formula (1) for z. The range z is associated with a particular pixel location, for example, 2X(t)−P(t), to produce a 1D collection of range image points [ (z1, 2X(t1−P(t1)) (z2, 2X(t2)−P(t2)) ... ] collected within one sweep of the slit ray 18 over the scene 2.

It will be appreciated that the present invention has provided a method and associated apparatus for employing VLSI architecture for triangulation range mapping of a scene which employs a 1D row or 2D parallel approach.

Figure 12:
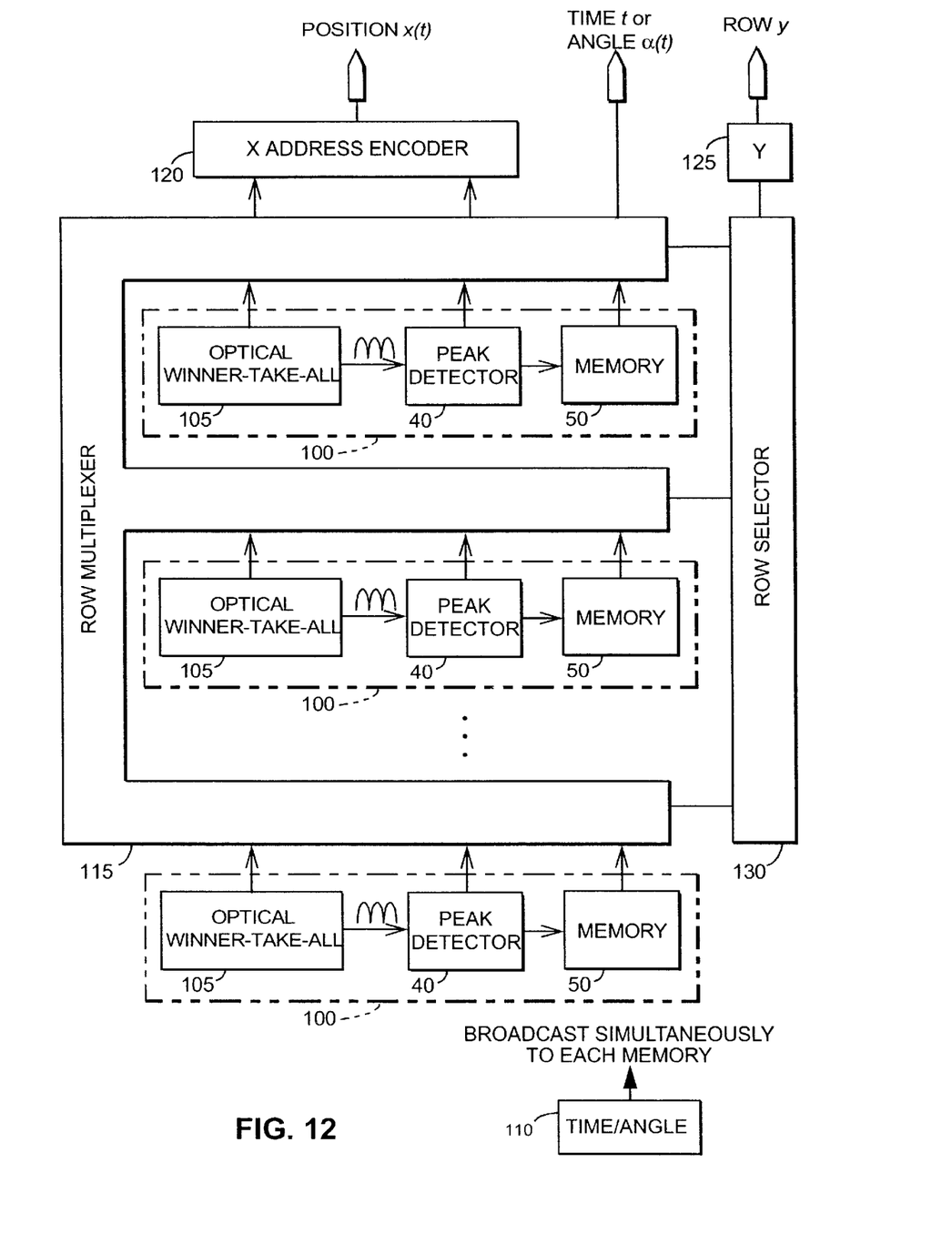
FIG. 12 shows a system expanding the 1D sensor extended into a 2D sensor.

FIG. 12 shows a 2D embodiment of the shape-measuring sensor 70. (FIG. 1) Such a two-dimensional arrangement may have two or more rows of sensors which are preferably parallel to each other. As depicted in FIG. 12, the 2D arrangement is achieved by replicating the row sensor 100 in the direction substantially transverse to the rows. The means for measuring time or angle 110 broadcasts its signals simultaneously to each memory 50 in all row sensors 100. A row selector 130 controls a row multiplexer 115. The row selector 130 selects one row sensor 100 at the time. When a particular row sensor 100 is selected, its output signals, namely, the signals from the optical winner-take-all 105, the signal from the peak detector 40, and the signal form the output port of the memory 50, are routed by a row multiplexer 115, to the address encoder 120 and the time/angle port. Those skilled in art know of a number of ways for using electronic switches to build the row multiplexer 115.

As the lights stripe 8 passes over multiple row sensors 100, the peak detectors 40 in each row sensor 100 detects positive and negative peaks as 10 described earlier. Depending on the shape of objects in the visual scene, the peaks may occur simultaneously in all rows, simultaneously in some of the rows or at different instances in all rows. The function of the row selector 130 is to connect each row to the address encoder 120 and the time-angle port in timely fashion, so that the location of the light stripe 8 can be interpreted and the memory 50 is emptied before another peak is detected in that row.

The row selector 130 could be of an asynchronous type. In that case the row selector 130 receives asynchronous requests for service from a particular row sensor 100 each time a peak is detected in that particular row sensor 100. The asynchronous type row selector 130 then acknowledges the request and services the requesting row sensor 100 by connecting it through the row multiplexer 115. If several row sensors 100 place simultaneous requests for service, then the asynchronous row selector 130 arbitrates and chooses only one requesting row to service, while putting other requests on hold. After one row is serviced, that is, the row is connected through the multiplexer 115 and its memory 50 is read and signals encoded in the address encoder 120, another requesting row is serviced. Each time a row is selected its address is figured out with another encoder and latched in a row address register 125. The x position from the address encoder 120, the time-angle information read from a selected memory 50, and the y address of the row are forwarded to the processor 80 for building the range images.

The service cycle of the row selector preferably should be short so that it can potentially serve all the rows within the interval between the two consecutive peaks one row sensor 100 can generate. It is reasonable to estimate this interval as the time it takes the light stripe 8 to travel the distance d/2, half the width of one photodetector 12*a*, 12*b*, . . . , 12*n*. Using their experience with conventional digital buses, for example, those skilled in art can easily carry out a simple calculation and conclude that the service cycle in practice is very short compared to the practical sweep rates.

The row selector 130 could be of a synchronous type. In that case, the row selector 130 scans rows one by one in a predetermined order checking to see if any detected any peaks. Those rows that have detected peaks will have valid signals and will be multiplexed for interpretation and read out in the address decoder 120 and the processor 80. Those skilled in art will realize that the row selector scanning rates can be substantially high, so that very frequent peaks can be successfully handled by the synchronous row selector. Again, each time the row is selected its address is figured out and latched in a row address register 125.

While the above description contains many preferred embodiments of the invention, it will be appreciated that the reader perceives various modifications and additions that may be made to the invention. For example, the invention may implement as an integrated circuit, or may be other than integrated circuit while still preserving features of the invention. Various geometric arrangements and modifications of the related mathematical formulae may be employed. Those skilled in art may devise different embodiments for various functional parts of the present invention. For example, the processor 80, could be a microprocessor chip. On the other hand, it could be implemented as a lookup table 95 since the quantities x(t) and α(t) can be represented as finite integers.

Those skilled in art could use various methods to enhance the saliency of the light stripe 8 in the image plane 6. For example, special color slit-ray sources and optical filters tuned to that color may be employed. In order to enhance the sensory signal, different photodetector and preamplifiers may be employed.

Similar functional blocks may replace the winner-take-all. One obvious example is a looser-take-all, provided that the saliency map is adjusted accordingly. In fact any selector that uniquely selects the most salient features among many features can replace the combination of the preprocessor array 20 and the winner-take-all processor 30, as long as the precise location of the light stripe 8 is selected as densely as possible along the row sensor 100.

Whereas particular embodiments of the invention have been described above, for purposes of illustration, it will be evident to those skilled in the art that numerous variations of the details may be made without departing from the invention as defined in the appended claims.

What is claimed:

1. A method of range imaging a scene comprising the steps of:

directing a planar light beam onto a first portion of said scene, delivering a reflected light stripe from said first portion to a row of sensors, said sensors emitting electrical signals responsive to said first reflected light stripe, creating a salient feature containing saliency map from said first electrical signals with said salient feature being spatially related to said reflected light stripe and not based solely on the instantaneous light impinging on a single sensor, sweeping said light to progressively create planar light beams on other portions of said scene, and repeating said cycle a plurality of times to establish said range image.

2. The method of range imaging of claim 1 further comprising the steps of:

creating said saliency map from said electrical signals while substantially excluding electrical signals due to ambient light.

3. The method of range imaging of claim 2 further comprising the steps of:

encoding saliency as the magnitude of the value contained within said saliency map with said salient feature having the largest magnitude, and employing a winner-take-all circuit to determine said largest magnitude location.

4. The method of range imaging of claim 3 further comprising the step of:

employing said method to determine the magnitude of the selected salient feature.

5. The method of range imaging of claim 3 further comprising the step of:

converting said sensor array electrical output signals by means of a preprocessor array into a saliency map which is introduced into said winner-take-all circuit.

6. The method of range imaging of claim 1 further comprising the step of:

determining from said saliency map when said reflected light stripe transitions from one said sensor to another said sensor.

7. The method of range imaging of claim 1 further comprising the step of:

determining from said saliency map when said reflected light stripe is generally centered over a said sensor.

8. The method of range imaging of claim 1 further comprising the step of:

employing laser light as said planar light beam.

9. The method of range imaging of claim 1 further comprising the step of:

employing triangulation based imaging in said process.

10. The method of range imaging of claim 9 further comprising the steps of:

delivering information regarding position, time and angular position to a processor, and employing said processor to determine said range image.

11. The method of range imaging of claim 10 further comprising the step of:

providing said winner-take-all circuit embedded in a microchip.

12. The method of range imaging of claim 10 further comprising the steps of:

providing the output of a winner-take-all circuit to an address encoder to provide position information to said processor, and providing the output of a winner-take-all circuit to a peak detector which provides a latching signal to said processor to indicate when to receive time or angular position information or both.

13. The method of range imaging of claim 1 further comprising the step of:
employing said method with a one-dimensional sensor array.

14. The method of range imaging of claim 1 further comprising the step of:
employing said method with a two-dimensional sensor array having at least two generally parallel linear arrays of said sensors.

15. The method of range imaging of claim 1 further comprising the step of:
sweeping said light by impinging said light on a scanning mirror.

16. The method of range imaging of claim 1, further comprising the step of:
continuously sweeping said light through a plurality of said cycles.

17. The method of range imaging of claim 16, further comprising the steps of:
employing triangulation based imaging in said process;
delivering information regarding position, time, and angular position to a processor; and
employing said processor to determine said range image.

18. The method of range imaging of claim 1 further comprising the steps of:
said linear array of sensors receiving a peak light intensity when said reflected light stripe is on the center of a said sensor and a reduced light intensity when said reflected light stripe is adjacent an edge of a said sensor.

19. The method of range imaging of claim 18 further comprising the step of:
employing sensors selected from the group consisting of photodiodes and phototransistors.

20. The method of range imaging of claim 1 further comprising the step of:
said electrical signals emitted by said sensors establishing a generally bell-shaped curve for each said sensor.

21. The method of range imaging of claim 20 further comprising the step of:
said bell-shaped curves from adjacent said sensors overlapping each other.

22. The method of range imaging of claim 1 further comprising the step of:
employing said method to determine the shape of a scene which is an object having at least one non-planar surface.

23. Apparatus for range imaging a scene comprising
a light source for directing a planar light beam onto a first portion of said scene,
means for sequentially directing output from said light source sequentially to different portions of said scene,
at least one linear array of sensors means for receiving a reflected light stripe from said scene for each said planar light beam,
said sensors emitting electrical output signals responsive to said reflected light stripe,
a processor for determining a salient feature from said electrical signals which salient feature is spatially related to said reflected light stripe, and
said processor combining the salient feature from each said sensor array sweep to create said range image.

24. The apparatus of claim 23 including
said light source being a source of laser light.

25. The apparatus of claim 24 including
said means for delivering said light beam sequentially to different portions of said scene including a scanning mirror.

26. The apparatus of claim 24 including
said sensors being a one-dimensional linear array of sensors.

27. The apparatus of claim 24 including
said sensors having at least two parallel said linear arrays of sensors.

28. The apparatus of claim 23 including
a winner-take-all circuit for determining the location of said salient feature in the output of said sensors with respect to a said reflected light stripe.

29. The apparatus of claim 28 including
a preprocessor for converting the sensor output electrical signals into a saliency map for delivery to said winner-take-all circuit.

30. The apparatus of claim 29 including
a peak detector receiving output from said winner-take-all circuit, and
an address encoder for receiving output from said winner-take-all circuit and said peak detector and delivering responsive information to said processor.

31. The apparatus of claim 30 including
a memory for receiving output from said peak detector and from a time and angle monitoring unit and emitting information regarding time or angle or both to said processor.

32. The apparatus of claim 29 including
said processor having a temporal filter.

33. The apparatus of claim 28 including
said winner-take-all circuit being embedded in a microchip.

34. The apparatus of claim 23 including
said apparatus being structured to range image a three-dimensional article having at least one non-planar surface.

35. The apparatus of claim 34 including
employing as said sensors sensors selected from the group consisting of photodiodes and phototransistors.

36. The apparatus of claim 23 including
said apparatus being so configured as to provide triangulation based imaging.

37. A method for collecting range images comprising
illuminating a scene with a scanning structured light,
forming an optical image on an image plane using optics,
generating a salient feature from the optical image of the intersection of the structured light and the object surface,
detecting the optical image with at least one linear photodetector array,
detecting the instant when the salient feature transitions from one photodetector to another,
determining the location of the transition in reference to the said linear photodetector array,
determining geometric relationships of the image formation arrangement at said instant, and
employing said location of the transition and said geometric relationships of the image formation arrangement to determine the range using a processor.

38. The method of claim 37 including
detecting the instant when the salient feature passes a predetermined position within a one photodetector and determining the location of said position in said photodetector with respect to said linear photodetector array.

39. A method for collecting range images of a scene comprising directing a planar light beam onto a first portion of said scene, delivering a reflected light stripe from said first portion to a row of sensors, producing an electronic image with said sensors responsive to said reflected light stripe, producing a saliency map from said electronic image, said saliency map not being an amplified or attenuated or unaltered replica of said electronic image, said saliency map containing a salient feature, wherein said salient feature is indicative of the location of said light stripe along said row of sensors, determining substantially at the same instant the location of said reflected light stripe along said row by examining said saliency map in its entirety, and the geometric relationship between said planar beam and said row, determining a range to said scene employing said location and said geometric relationship, and repeating said cycle.

40. The method for collecting range images of claim 39 including in effecting said repeating of said cycle, continuously sweeping said planar light beam across at least a portion of said scene.

41. The method for collecting range images of claim 39 including employing said method with a plurality of generally parallel said rows.

42. A method for collecting range images of a scene comprising directing a planar light beam onto a first portion of said scene, delivering a reflected light stripe from said first portion to a row of sensors, producing an electronic image with said sensors responsive to said reflected light stripe, producing a saliency map from said electronic image, said saliency map containing a salient feature, wherein said salient feature is indicative of the location of said light stripe along said row of sensors, determining substantially at the same instant, a first location along said row where said reflected light stripe transitions from one said sensor to another by examining said saliency map in its entirety, and a first geometric relationship between said planar beam and said row, and calculating a range to said scene employing said first location and said first geometric relationship.

43. The method for collecting range images of claim 42 including determining substantially at the same instant a second location along said row where said reflected light stripe passes across a predetermined portion of a said sensor by examining said saliency map in its entirety, and a second geometric relationship between said planar beam and said row, and calculating a range to said scene employing said second location and said second geometric relationship.

44. The method for collecting range images of claim 43 including employing said method with a plurality of generally parallel said rows.

45. The method for collecting range images of claim 42 including in effecting said repeating of said cycle, continuously sweeping said planar light beam across at least a portion of said scene.

\* \* \* \* \*

UNITED STATES PATENT AND TRADEMARK OFFICE
CERTIFICATE OF CORRECTION

PATENT NO.    : 6,421,132 B1                                            Page 1 of 1
DATED         : July 16, 2002
INVENTOR(S)   : Vladimir M. Brajovic It is certified that error appears in the above-identified patent and that said Letters Patent is hereby corrected as shown below:

Column 2,
Line 33, "tells" should read -- cells --.

Column 3,
Line 23, "SO" should read -- so --.

Column 5,
Line 23, "sys" should read -- system --.

Column 6,
Line 48, "a(t)" should read -- α(t) --.
Formula 1, delete the second ")" after "(t))".

Column 7,
Line 1, "a(t)" should read -- α(t) --.

Column 10,
Line 4, "pealing" should read -- peaking --.

Column 12,
Line 8, "4t)" should read -- x(t) --.
Line 18, "(α(t)" should read -- (α(t)) --.

Signed and Sealed this

Twenty-sixth Day of November, 2002

*Attest:*

*Attesting Officer*

JAMES E. ROGAN
*Director of the United States Patent and Trademark Office*